United States Patent
Stewart

(10) Patent No.: US 9,278,750 B2
(45) Date of Patent: Mar. 8, 2016

(54) AIRCRAFT RIB ASSEMBLY

(71) Applicant: AIRBUS OPERATIONS LIMITED, Bristol (GB)

(72) Inventor: David Mark Stewart, Bristol (GB)

(73) Assignee: Airbus Operations Limited, Bristol (GB)

( * ) Notice: Subject to any disclaimer, the term of this patent is extended or adjusted under 35 U.S.C. 154(b) by 154 days.

(21) Appl. No.: 13/688,415

(22) Filed: Nov. 29, 2012

(65) Prior Publication Data

US 2013/0146711 A1 Jun. 13, 2013

(30) Foreign Application Priority Data

Dec. 7, 2011 (GB) .................................. 1120992.1

(51) Int. Cl.
*B64C 3/18* (2006.01)
*B64C 9/02* (2006.01)

(52) U.S. Cl.
CPC ................. *B64C 3/185* (2013.01); *B64C 3/187* (2013.01); *B64C 9/02* (2013.01); *Y02T 50/32* (2013.01); *Y10T 29/49826* (2015.01)

(58) Field of Classification Search
CPC .......... B64C 3/185; B64C 3/187; B64C 9/02; B64C 9/323; B64C 9/32; B64C 9/326
USPC .............................. 244/123.1, 123.8, 211, 217
See application file for complete search history.

(56) References Cited

U.S. PATENT DOCUMENTS

| | | | | |
|---|---|---|---|---|
| 1,342,353 | A * | 6/1920 | Schneider | 403/57 |
| 2,376,745 | A * | 5/1945 | Wimer, Jr. et al. | 244/117 R |
| 2,393,547 | A | 1/1946 | Martin | |
| 2,421,960 | A | 6/1947 | Pagon | |
| 2,445,399 | A * | 7/1948 | Johnson | 244/87 |
| 3,594,851 | A * | 7/1971 | Swatton | 16/276 |
| 6,170,157 | B1 * | 1/2001 | Munk et al. | 29/897.2 |
| 2004/0056152 | A1 * | 3/2004 | Yamashita | B64C 3/18 244/123.8 |
| 2008/0265094 | A1 * | 10/2008 | Van Der Veen et al. | 244/123.1 |
| 2009/0217487 | A1 * | 9/2009 | Sharp et al. | 16/387 |
| 2009/0218442 | A1 | 9/2009 | McAlinden et al. | |
| 2009/0218446 | A1 * | 9/2009 | McAlinden et al. | 244/131 |
| 2010/0044511 | A1 * | 2/2010 | Coulter et al. | 244/123.1 |
| 2010/0127127 | A1 | 5/2010 | Manzano | |
| 2012/0091283 | A1 * | 4/2012 | Uchida et al. | 244/213 |
| 2012/0224964 | A1 * | 9/2012 | Clark | 416/23 |

OTHER PUBLICATIONS

Extended European Search Report dated Mar. 1, 2013 in EP 12194683.4-1754.
Search Report for UK1120992.1, dated Apr. 2, 2012.

* cited by examiner

*Primary Examiner* — Tien Dinh
*Assistant Examiner* — Alexander V Giczy
(74) *Attorney, Agent, or Firm* — Nixon & Vanderhye P.C.

(57) ABSTRACT

A moveable control surface mounting rib assembly (110) comprises a rib (144) which is attached to one side of a spar member (112) and a stiffener (160) attached to another side of the spar member. The stiffener abuts the upper and lower flanges of the spar member in order to react the loads. The invention is applicable to the mounting of any movable control surface.

21 Claims, 4 Drawing Sheets

AIRCRAFT RIB ASSEMBLY

RELATED APPLICATION

This application claims priority to UK Patent Application No. 1120992.1 filed 7 Dec. 2011, the entire content of which is hereby incorporated by reference.

BACKGROUND OF THE INVENTION

The present invention is concerned with an aircraft rib assembly. More particularly, the present invention is concerned with an aircraft rib assembly suitable for attachment of an aircraft control surface at any of a number of positions along the spar of an aircraft wing, vertical stabiliser or horizontal stabiliser.

It is desirable to mount movable control surfaces such as inter alia flaps, slats, ailerons and rudders to fixed aerodynamic structures such as wings and stabilisers (e.g. vertical or horizontal stabilisers). This is usually achieved using a fixed rib which extends from a structural component of the fixed structure (such as a fore or aft rib) to the mounting point of the relevant control surface.

In one example, spoilers are aerodynamic devices which are attached to the trailing edge of aircraft wings in order to disrupt the boundary layer flowing across the wing during flight. They are used to reduce the aerodynamic effect of the wing in order to decrease lift and increase drag to slow the aircraft.

Known spoilers are mounted using a spoiler rib which projects rearwardly from the rear spar of the wing. The rib comprises a spoiler attachment point lug at the rear, a first limb and a second limb both projecting from the attachment point at an angle to each other, forming a "V". The rib is attached to the wing at two points. The first limb is attached at an upper point where the rear spar meets the upper wing skin. The second limb is attached at a lower point where the spar meets the lower wing skin. At both points the rib is mechanically fastened to both the spar and the skin.

Fastening at the top and bottom of the spar provides the largest moment arm to react the forces experienced by the spoiler in flight.

Although optimised for load reaction, a problem with this design is that because the rib needs to be attached at the extreme top and bottom of the rear spar, each rib must be individually manufactured for its position along the wingspan because the depth of the spar reduces from fuselage to wing tip.

A further disadvantage of the prior art is that the geometry of the wing skin is somewhat variable (particularly for in-service aircraft) and, as such, some shimming or fettling of the rib is required in order to securely fix it in place.

Because of wing bending in flight, the upper and lower wing skins are subject to high strains. This necessitates bolts of a high diameter between the wing skin overhang and the ribs, and also thick skin material at the rib attachment positions. It is generally not practical to make the wing skin locally thicker at these points and, as such, the thickness is carried throughout the wingspan which adds significant weight to the aircraft. The additional weight in order to support this structural requirement may be as much as 10 kg per meter of wingspan.

Finally, struts supporting the lower shroud panel have to be fastened onto the ribs by means of bolt-on support brackets which constitute additional parts and require more expensive assembly.

Similar problems arise with other control surfaces mounted to fixed aerodynamic structures, for example ailerons mounted to the trailing edge of wings and horizontal stabilisers, and rudders mounted to the trailing edge of vertical stabilisers.

SUMMARY OF INVENTION

It is an aim of the present invention to overcome, or at least mitigate, the above problems.

According to a first aspect of the invention, there is provided a fixed aerodynamic structure assembly comprising:
 a fixed aerodynamic structure spar having an interior facing side and an exterior facing side,
 a first movable control surface rib attached to, and extending from the exterior facing side of the wing spar,
 a first stiffener positioned on the interior facing side of the fixed aerodynamic structure spar and connected to the first movable control surface rib through the wing spar.

By "fixed aerodynamic structure" we mean a surface extending from e.g. the fuselage which is primarily intended to influence the air flow around the aircraft, for example a wing, horizontal stabiliser or vertical stabiliser.

The rib may be configured for the attachment of a movable control surface.

By "movable control surface" we mean an aerodynamic surface mounted to be movable relative to the fixed aerodynamic structure, for example to affect the aerodynamic properties of the surface. This may be, inter alia, a flap, slat, spoiler, aileron or rudder.

The invention allows the load from the movable control surface rib to be reacted by the stiffener. For example with a wing spoiler mounting system, by providing a stiffener, torque about a spanwise axis can be reacted. The direction of the incident forces will tend to pull the reinforcement rearward, and its position nested within and abutting the spar and wing skins provides a continuous surface for the load to be reacted over without the need for a large number of fasteners attached to the wing skin.

The need for the rib itself to be secured to both wing skins is also eliminated and, as such, the rib can have a single limb and can be secured to the rear spa at an intermediate point between the skins. This removes the necessity for the rib to be individually manufactured for each position along the wing. Therefore replacement of a rib is made easier. Of course the stiffener will need to be sized to the position along the wing spar, but its position in front of the spar means that it is less susceptible to damage and far less likely to require replacement.

A further advantage is that the present invention is lighter and, therefore, less costly in terms of manufacturing costs and aircraft efficiency. Another advantage is the lack of part variability in spoiler ribs and the cost savings associated therewith.

The single attachment point for each rib will negate the significant effects of thermal strains in use, as seen in the prior art.

Preferably the first stiffener and the rib are connected via at least one mechanical fastener passing through the wing spar. Preferably the fastener exerts a clamping force on the wing spar sandwiched between the stiffener and the rib.

Preferably the first stiffener comprises:
 a first surface in abutment with the interior facing side of the fixed aerodynamic structure spar,
 a second surface extending from a first end of the first surface towards the interior of the fixed aerodynamic structure in use, in which the third surface is in abutment with a first corresponding surface of the aircraft fixed aerodynamic structure.

Preferably the first corresponding surface of the aircraft fixed aerodynamic structure is a first flange of a spar extending towards the interior of the fixed aerodynamic structure.

Preferably the first stiffener comprises:
a third surface extending from a second, opposite, end of the first surface to the second surface towards the interior of the fixed aerodynamic structure,
in which the second surface is in abutment with a second corresponding surface of the aircraft fixed aerodynamic structure.

Preferably the second corresponding surface of the aircraft fixed aerodynamic structure is a second flange of the spar extending towards the interior of the fixed aerodynamic structure.

Preferably the spar defines a concavity facing the interior of the fixed aerodynamic structure, and in which the first stiffener is nested in the concavity of the spar. The spar and stiffener may typically be substantially "C" shaped in cross-section.

Preferably the assembly comprises:
an first skin extending over a first end of the fixed aerodynamic structure spar; and,
a second skin extending over a second end of the fixed aerodynamic structure spar,
in which the movable control surface rib extends from a mounting position on the spar between, and spaced from, the first and second skins.

Preferably the mounting position is substantially midway between the first and second skins.

Preferably the assembly comprises:
a second movable control surface rib attached to, and extending from the exterior facing side of the fixed aerodynamic structure spar,
a second stiffener positioned on the interior facing side of the fixed aerodynamic structure spar and connected to the second movable control surface rib through the wing spar,
in which the first and second movable control surface ribs are proximate so as to define a common mounting point for a movable control surface.

In this case, the first and second movable control surface ribs and first and second stiffeners may be mirror images of each other.

Preferably the assembly comprises a first shroud panel extending in an exterior direction from a first end of the fixed aerodynamic spar in use, which first shroud panel is connected to the first movable control surface rib by a first strut.

Preferably the first strut is connected to a position on the first movable control surface rib spaced from the fixed aerodynamic structure spar.

Preferably the first strut is then connected to a position on the first shroud panel at a position spaced from the fixed aerodynamic structure spar.

The assembly may comprise a second shroud panel extending in an exterior direction from a second end of the fixed aerodynamic structure spar in use, which second shroud panel is connected to the first movable control surface rib by a second strut.

The second strut may be connected to a position on the first movable control surface rib spaced from the fixed aerodynamic structure spar.

Also, the second strut may be connected to a position on the upper shroud panel at a position spaced from the fixed aerodynamic structure spar.

The fixed aerodynamic structure may be an aircraft wing, horizontal stabiliser or vertical stabiliser.

According to a second aspect of the invention there is provided a method of manufacture of an aircraft control surface assembly comprising the steps of:
providing a fixed aerodynamic structure spar having an exterior facing side and an interior facing side in use;
providing a first stiffener positioned at the interior facing side of, and in abutment with, the fixed aerodynamic structure spar;
providing a first rib,
attaching the first rib to the first stiffener through the fixed aerodynamic structure spar such that the fixed aerodynamic structure spar is sandwiched therebetween.

SUMMARY OF DRAWINGS

An example aircraft spoiler rib in accordance with the present invention will now be described with reference to the accompanying drawings in which.

DETAILED DESCRIPTION

Figure 1:
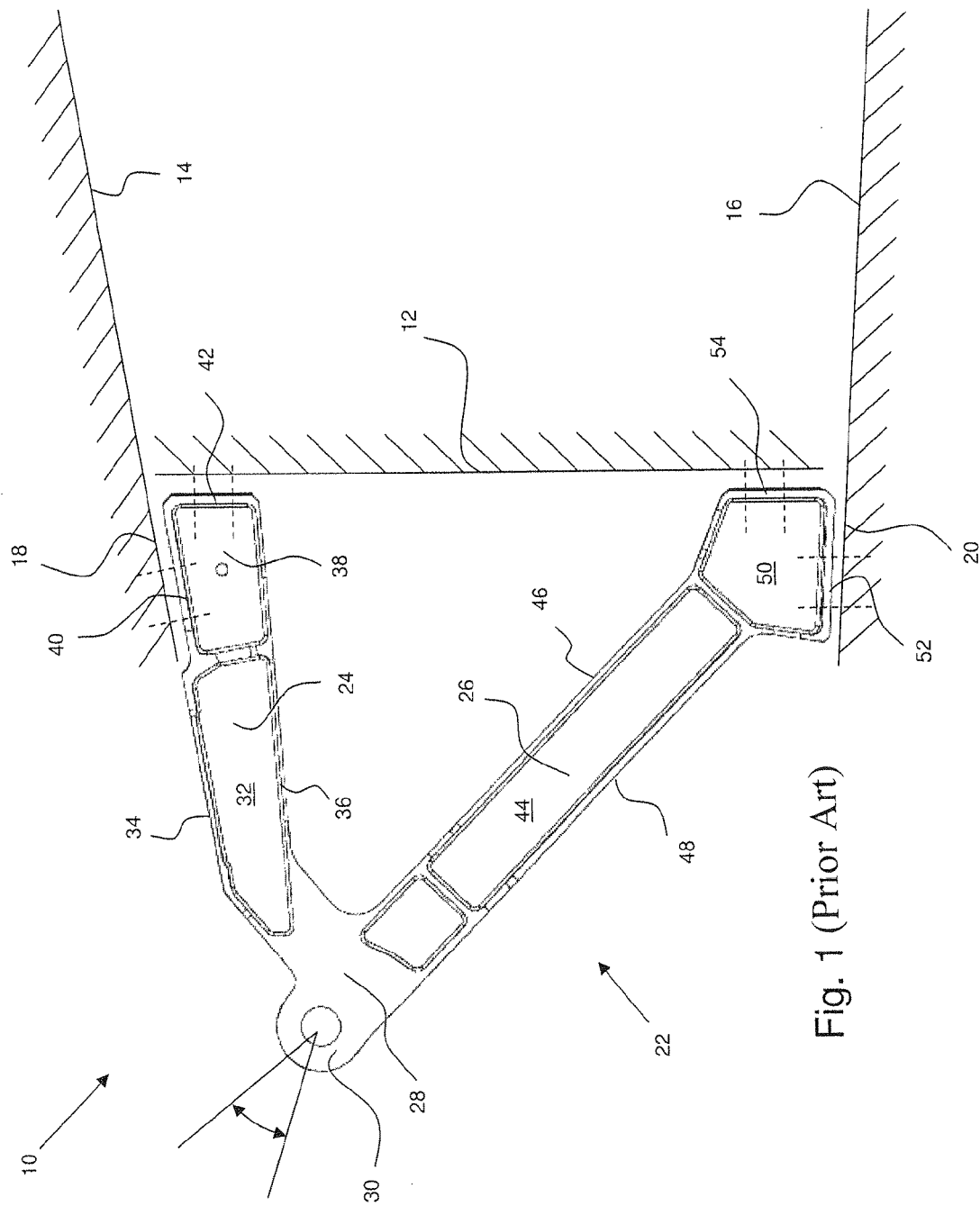
FIG. 1 is a side view of a prior art spoiler rib assembly.

Turning to FIG. 1, a prior art spoiler rib assembly 10 is shown. The assembly 10 comprises a wing spar 12 (shown schematically) which extends along the length of an aircraft wing. An upper skin 14 and a lower skin 16 are shown either side of the spar 12. Each of the upper and lower skins 14, 16 define an overhang 18, 20 respectively which project past the rearmost position of the spar 12.

A spoiler rib 22 is provided which is generally v-shaped having a first limb 24, and a second limb 26 which join at an apex 28. A lug 30 is positioned at the apex 28 for rotational attachment of a spoiler.

The first limb 24 is I-beam shaped in cross section, comprising a plate 32 having an upper flange 34 and a lower flange 36. At an end portion 38, opposite the apex 28, the first limb 24 has an attachment formation 40 for attachment to the overhang 18 of the upper skin 14 and a second attachment formation 42 for attachment to the region of the spar 12 proximate the upper skin 14.

Similarly, the second limb 26 is I-beam shaped in cross-section, having a plate 44, an upper flange 46 and a lower flange 48. At an end portion 50 of the second limb 26, a third attachment formation 52 is provided for attachment to the overhang 20 of the lower skin 16 and a fourth attachment formation 54 is provided for attachment to the region of the spar 12 where it meets the lower skin 16.

Due to the taper of the aircraft wing, the spar 12 decreases in height as it approaches the wing tip. As a result, the upper and lower skins 14, 16 get gradually closer together. Therefore, it will be noted that each rib 22 must be made a different shape and size in order to accommodate the changing profile of the wing. Furthermore, due to variability in the skin geometry, fettling or shimming of the end portions 38, 50 is often required to fit the rib 22 to the wing.

Figure 2:
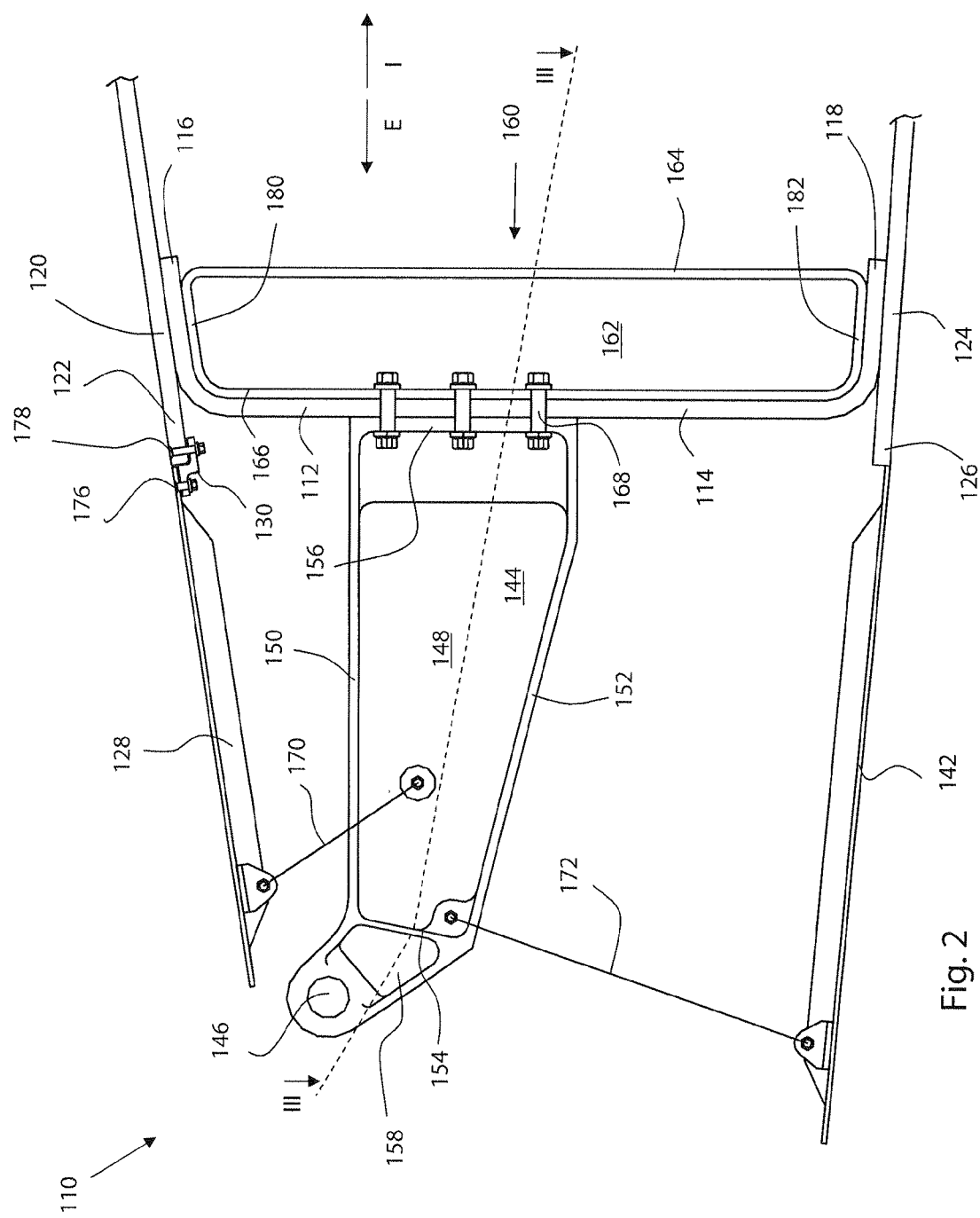
FIG. 2 is a side view of a spoiler rib assembly in accordance with the present invention.
Figure 3:
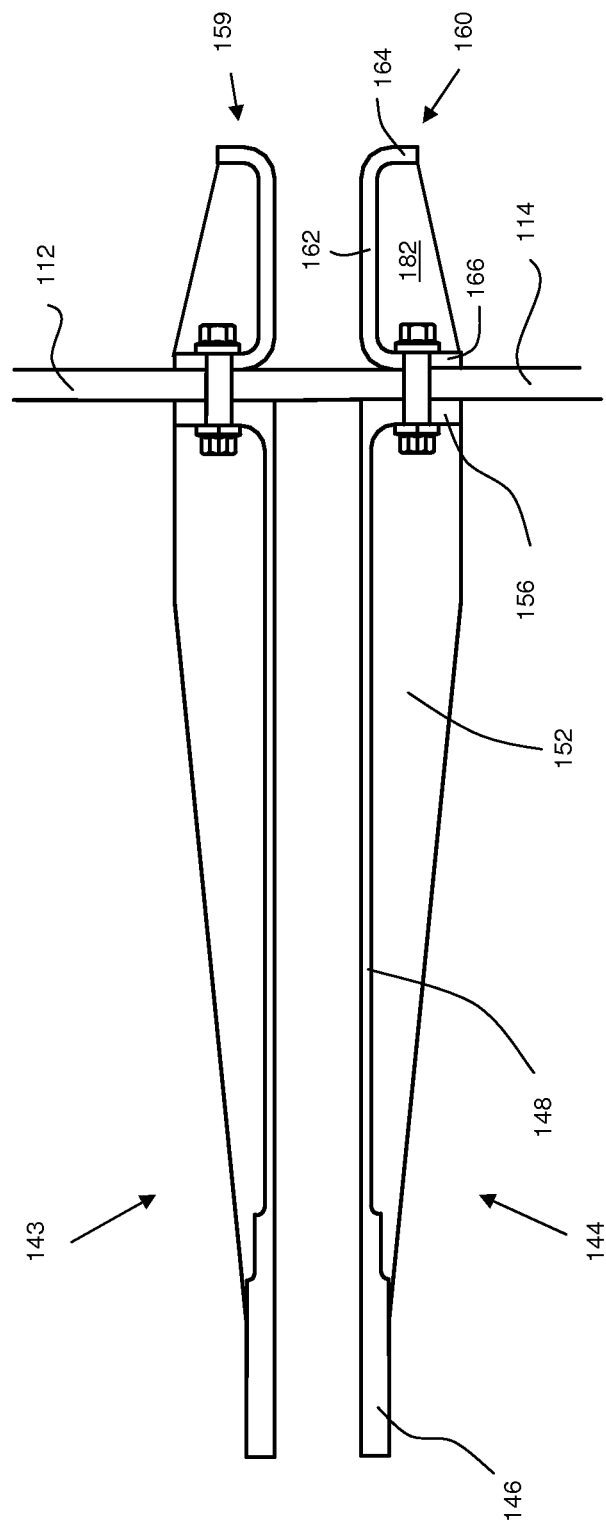
FIG. 3 is a sectioned plan view of the spoiler rib assembly along line III-III of FIG. 2.
Figure 4:
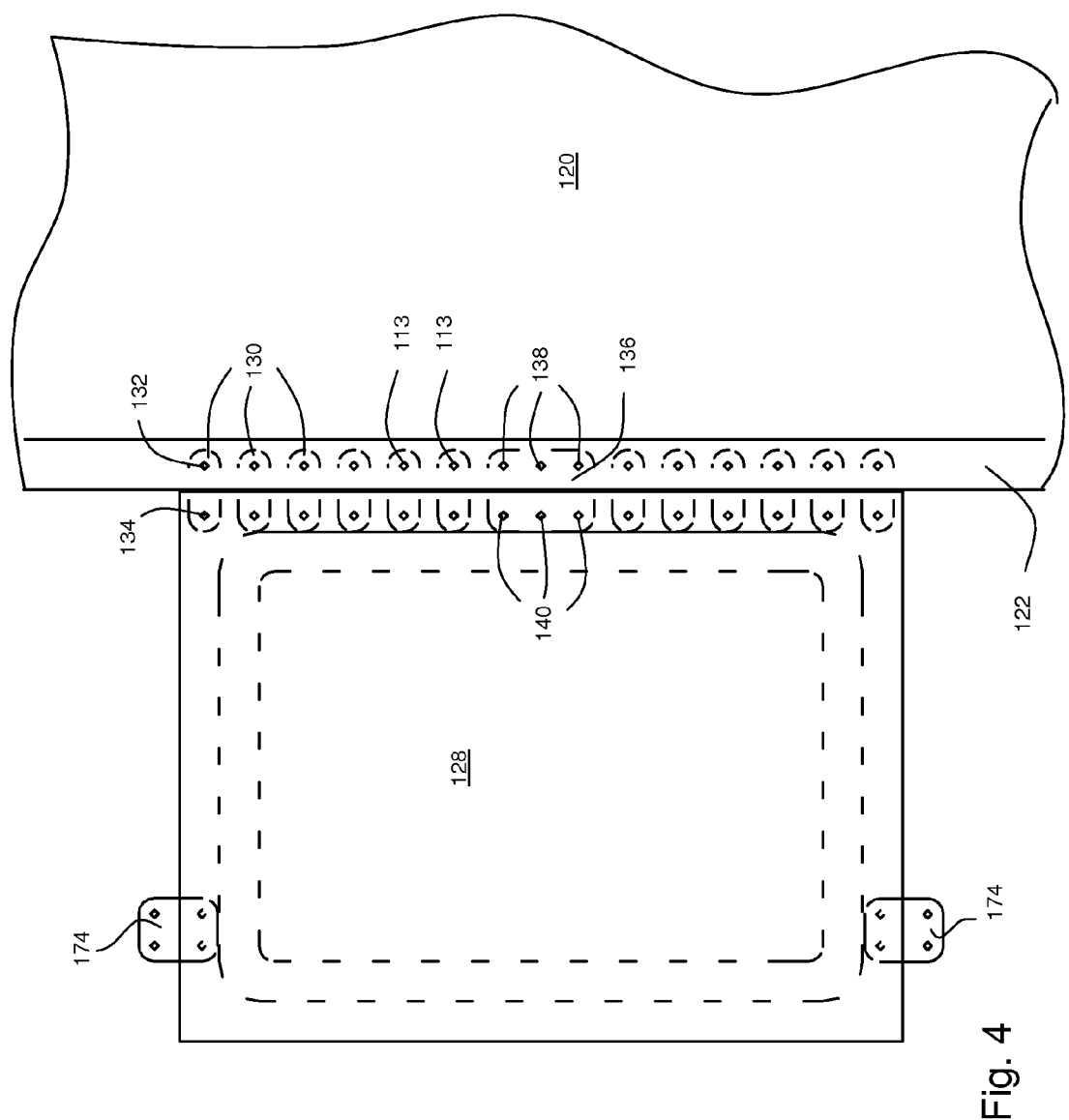
FIG. 4 is a plan view of the spoiler rib assembly of FIG. 2.

Turning to FIGS. 2 to 4, a spoiler rib assembly 110 is shown in accordance with the present invention. The spoiler rib assembly 110 comprises a trailing edge wing spar 112. The spar 112 is C-shaped in section having a plate-like member 114, an upper flange 116 and a lower flange 118, both projecting forward from the plate 114, in an interior direction I. The interior direction I is the direction towards the interior of the wing box, which in this case is forward in terms of the whole aircraft coordinate system. The exterior direction E is opposite to the interior direction I and is rearward in the whole aircraft coordinate system. It will be noted that should the spar 112 be a spar at the front of the wing, the interior direction would be rearward, and the exterior direction would be forward.

An upper wing skin 120 is attached to the upper flange 116 and defines an overhang 122 which projects rearwardly of the spar 112. The overhang defines a series of shroud attachment bores 113 regularly spaced in a spanwise direction.

A lower wing skin 124 is attached to the lower flange 118 and defines an overhang 126 which projects rearwardly of the spar 112.

An upper shroud 128 is provided which extends from the upper skin overhang 122. The upper shroud 128 is attached using a series of pivoting butt straps 130. Each of the butt straps 130 has a first bore 132 and a first end and a second bore 134 at a second end.

A central butt strap 136 is also provided in the spanwise centre of the upper shroud 128 and comprises a first row of attachment bores 138 and a second row of attachment bores 140.

A lower shroud 142 is also provided which extends from the overhang 126 of the lower skin 124.

A pair of spoiler ribs 143, 144 are provided. The ribs 143, 144 are substantially identical, but mirror images of each other and as such only the rib 144 will be described in detail. The rib 144 has a lug 146 for attachment of a spoiler (not shown). The rib 144 comprises a vertically oriented plate 148 having an upper and lower flange 150 and 152 respectively extending therefrom defining a C-section profile. First and second end flanges 154 and 156 are provided extending perpendicular to both plate 148 and upper and lower flanges 150, 152.

Beyond the first end flange 154, a dog-leg section 158 extends upwardly from the plate 148 at an angle to meet the lug 146.

The plate section 148 is significantly longer than the dog-leg section 158.

Two stiffeners 159, 160 are provided, for each rib 143, 144 respectively. Like the ribs 143, 144, the stiffeners 159, 160 are mirror images of each other and as such only the stiffener 160 will be described in detail. The stiffener 160 is concave comprising a central plate 162 bordered on fore and aft sides by flanges 164, 166 respectively, and on top and bottom ends by flanges 180, 182 respectively. The stiffener 160 extends within the entire height of the spar 112 abutting the plate 114 as well as upper flange 116 and lower flange 118. It will be noted that the upper and lower flanges 180, 182 of the stiffener 160 taper form a tight fit within the spar 112 against the flanges 116, 118 respectively.

When assembled, the spoiler rib 144 is abutted against the spar 112 with the second end flange 156 in contact with the plate 114 of the spar 112. Furthermore, the flange 166 of the stiffener 160 is in contact with the opposite side of the spar 112. As shown in FIGS. 2 and 3, the rib 144 and the stiffener 160 are secured together using bolts 168 such that the plate 114 of the spar 112 is sandwiched between them.

The upper shroud panel 128 is attached to the wing skin overhang 122 via the pivoting butt straps 130. Mechanical fasteners join the first bores 132 to the bores 113 on the wing skin, and the second bores 134 are joined to the shroud panel 128.

Use of the pivotable butt straps 130 which contain two pivoting bolt arrangements 176, 178 at each end allowing relative movement between the two components. This helps to reduce stresses in both components during in-flight stresses and strains due to mechanical forces and thermal effects.

The central butt strap 136 is also attached to the overhang 122 and the shroud panel 128 via respective bores 138, 140 and is non-rotatable for stability.

Transfer panels 174 are provided to join adjacent shroud panels 128.

Referring to FIG. 2, a first tension strut 170 is provided extending from a position on the plate 148 to an aft position on the shroud 128. A second tension strut 172 is provided extending between a position proximate the flange 154 and the lower shroud 142. These struts are relatively simple components which keep the various cantilevered structures hanging from the rear of the spar stable.

Variations fall within the scope of the present invention. In particular, the spar 112 may be any structural component of a fixed aerodynamic structure. The ribs 143, 144 may be used to attach any suitable movable aerodynamic surface, not just a spoiler.

The invention claimed is:

1. An aircraft aerodynamic structure assembly, said assembly comprising:
   a spar member having an interior facing side and an exterior facing side, and a first unitary flange,
   a first rib attached to and extending from the exterior facing side of the spar member, and
   a first stiffener positioned on the interior facing side of the spar member and connected to the first rib through the spar member, said first stiffener comprising a first panel surface at least partially in abutment with said interior facing side of said spar member, and a second panel surface unitary with the first panel surface and extending from a first end of the first panel surface, wherein the second panel surface abuts the first unitary flange,
   wherein said first rib and said first stiffener are directly connected through said spar member via at least one mechanical fastener passing through the spar member.

2. The aircraft aerodynamic structure assembly according to claim 1 wherein the fastener exerts a clamping force on the spar member which is sandwiched between the first stiffener and the first rib.

3. The aircraft aerodynamic structure assembly according to claim 1 wherein the first rib is a rib for mounting a movable control surface.

4. The aircraft aerodynamic structure assembly according to claim 1, wherein the spar member includes a second unitary flange, and
   the first stiffener comprises a third panel surface extending from a second end of the first panel surface towards the interior of the assembly, wherein the second end is opposite to the first end of the first panel surface and the third panel surface is in abutment with said second unitary flange.

5. The aircraft aerodynamic structure assembly according to claim 4 in which the spar member defines a concavity extending towards the interior of the assembly, and the first stiffener is nested in the concavity of the spar member.

6. The aircraft aerodynamic structure assembly according to claim 4, in which the first stiffener comprises a fourth panel surface extending between the first and third panel surfaces, the fourth panel surface being spaced from the first panel surface to define a chamber.

7. The aircraft aerodynamic structure assembly according to claim 1 further comprising:

a first skin extending over a first end of the spar member; and, a second skin extending over a second end of the spar member, wherein the first rib extends from a mounting position on the spar member between, and spaced apart from, the first and second skins.

8. The aircraft aerodynamic structure assembly according to claim 7 in which the mounting position is substantially midway between the first and second skins.

9. The aircraft aerodynamic structure assembly according to claim 1 comprising:

a second rib positioned on the exterior facing side of the spar member, and a second stiffener positioned on the interior facing side of the spar member, wherein the second rib and the second stiffener are connected through the spar member, and in which the first and second ribs are proximate so as to define a common mounting point for a movable control surface.

10. The aircraft aerodynamic structure assembly according to claim 9 in which the first rib and first stiffener are mirror images of the second rib and second stiffener respectively.

11. The aircraft aerodynamic structure assembly according to claim 1 comprising a first shroud panel extending from a first end of the spar member, in which the first shroud panel is connected to the first rib by a first strut.

12. The aircraft aerodynamic structure assembly according to claim 11 in which the first strut is connected to a position on the first rib spaced from the spar member.

13. The aircraft aerodynamic structure assembly according to claim 12 in which the first strut is connected to a position on the first shroud panel spaced from the spar member.

14. The aircraft aerodynamic structure assembly according to claim 11 comprising a second shroud panel extending from a second end of the spar member, in which the second shroud panel is connected to the first rib by a second strut.

15. The aircraft aerodynamic structure assembly according to claim 14 in which the second strut is connected to a position on the first rib spaced from the spar member.

16. The aircraft aerodynamic structure assembly according to claim 15 in which the second strut is connected to the upper shroud panel at a position spaced from the spar member.

17. The aircraft aerodynamic structure assembly according to claim 1 in which the spar member is included in one of an aircraft wing, a horizontal stabiliser or a vertical stabiliser.

18. The aircraft aerodynamic structure assembly according to claim 1, in which the first stiffener comprises a third panel surface extending from the first and second panel surfaces.

19. The aircraft aerodynamic structure assembly according to claim 18, in which the third panel surface is unitary with and extends from an edge of the first and second panel surfaces.

20. The aircraft aerodynamic structure assembly according to claim 1, in which a rounded corner is between the first and second panel surfaces, and the rounded corner is seated in a rounded corner adjacent the first unitary flange of the spar member.

21. A method of manufacture of an aircraft aerodynamic structure assembly comprising:

providing a spar member having an exterior facing side and an interior facing side and a first unitary flange;

providing a first stiffener positioned at the interior facing side of, and in abutment with, the spar member, said first stiffener comprising a first panel surface at least partially in abutment with said interior facing side of said spar member; and a second panel surface unitary with the first panel surface and extending from a first end of said first panel surface, wherein the second panel surface abuts the first unitary flange of the spar member;

providing a first rib, attaching the first rib to the first stiffener through the spar member such that the spar member is sandwiched therebetween and such that the first stiffener and the first rib are directly connected via at least one mechanical fastener passing through the spar member.

* * * * *